United States Patent
Howard

(10) Patent No.: US 8,945,399 B2
(45) Date of Patent: Feb. 3, 2015

(54) SYSTEMS AND METHODS FOR SEPARATING SAND FROM OIL

(75) Inventor: Erik M. Howard, Baytown, TX (US)

(73) Assignee: Taper-Lok Corporation, Houston, TX (US)

(*) Notice: Subject to any disclaimer, the term of this patent is extended or adjusted under 35 U.S.C. 154(b) by 674 days.

(21) Appl. No.: 13/306,522

(22) Filed: Nov. 29, 2011

(65) Prior Publication Data
US 2013/0134108 A1 May 30, 2013

(51) Int. Cl.
| | |
|---|---|
| *B01D 21/24* | (2006.01) |
| *B01D 21/26* | (2006.01) |
| *B04C 5/04* | (2006.01) |
| *B04C 5/08* | (2006.01) |
| *B04C 5/085* | (2006.01) |
| *B04C 5/181* | (2006.01) |
| *B04C 5/185* | (2006.01) |
| *B04C 5/14* | (2006.01) |
| *B01D 17/038* | (2006.01) |
| *E21B 43/34* | (2006.01) |
| *B01D 17/02* | (2006.01) |

(52) U.S. Cl.
CPC .......... *B01D 21/2411* (2013.01); *B01D 21/267* (2013.01); *B04C 5/085* (2013.01); *B04C 5/185* (2013.01); *E21B 43/34* (2013.01); *B04C 5/181* (2013.01); *B01D 17/0217* (2013.01); *B04C 5/14* (2013.01); *B01D 2221/04* (2013.01)
USPC ......... 210/788; 210/512.1; 209/727; 209/733

(58) Field of Classification Search
USPC ........................ 210/788, 512.1; 209/727, 733
See application file for complete search history.

(56) References Cited

U.S. PATENT DOCUMENTS

| | | |
|---|---|---|
| 4,148,721 A | 4/1979 | Brown |
| 4,389,307 A | 6/1983 | Boadway |
| 2001/0002009 A1 | 5/2001 | Gil |

*Primary Examiner* — David A Reifsnyder
(74) *Attorney, Agent, or Firm* — Law Offices of Mark L. Berrier

(57) ABSTRACT

Systems and methods for separating sand and other solids from oil and other fluids produced from a well. The present systems and methods introduce the fluids at relatively high speed into a generally cylindrical separation chamber. The fluids flow in a generally circular path within the chamber, causing the solids and higher density fluid/media to be urged outward from the axis of the chamber as the fluids flow from the upper portion of the chamber. Because the solids become concentrated at the outer wall of the chamber, the fluid in a central portion of the chamber is substantially free of the solids, and can be removed from the chamber via a fluid outlet. The solids concentrated at the outer wall of the chamber continue to move downward into an accumulation chamber in which the fluid speed is reduced, allowing the solids to settle out of the fluid.

20 Claims, 5 Drawing Sheets

SYSTEMS AND METHODS FOR SEPARATING SAND FROM OIL

BACKGROUND

1. Field of the Invention

The invention relates generally to the production of natural gas, oil and other fluids from wells, and more particularly to systems and methods for removing sand and other solids from these fluids.

2. Related Art

Often, in the production of oil from wells, the oil is mixed with other, unwanted substances. These unwanted substances may include fluids such as gas and water, or solids such as sand. Gas and water may be mixed with the oil in underground reservoirs or other geological formations, and may flow into the well. Sand is commonly introduced into the oil as a result of production operations which are designed to fracture oil-bearing formations and thereby allow the oil to flow into the well. This technique of fracturing oil-bearing formations may be referred to as fracturing or "fracking" the well.

The well equipment which is used to produce oil from a well typically includes components that are designed to separate the unwanted substances from the oil. For instance, a sand separator is commonly provided at the surface of the well to remove the sand that may be present as a result of fracking.

Conventional sand separation systems primarily rely on gravity to separate the sand from the fluids that are produced from a well. Typically, fluid is introduced into the central portion of a large, vertically oriented chamber through a pipe that is referred to as a stinger. The fluid flows slowly upward, typically through one or more baffles, to an outlet at the top of the chamber. The chamber has a large diameter so that the linear speed of the fluid flowing through the chamber will be minimized. This allows the sand to settle out of the fluid and fall to the bottom of the chamber, where it can be accumulated and removed.

There are various problems with the use of conventional sand separators to remove sand from oil or other fluids. For example, as noted above, the chamber of the apparatus needs to be large in order to minimize the speed of the fluid so that the sand can settle out. The large size of the apparatus can make it difficult to transport and install. Additionally, because of material cost, the sheer size of apparatus makes it more expensive.

Another problem is that it is difficult to accommodate the different operating conditions and fluid characteristics that may exist in different wells. For instance, one well may have a higher flow rate than another, so the settling of the sand out of the faster-flowing fluid may be less effective. Likewise, higher viscosity or lower temperature of the fluid may reduce settling in a conventional sand separator. Addressing these problems may require that an entirely different sand separator be used.

It would therefore be desirable to provide systems and methods for separating sand and other solids from the fluids that are produced from wells.

SUMMARY OF THE INVENTION

This disclosure is directed to systems and methods for separating sand and other solids from oil and other fluids that may be produced from a well, wherein these systems and methods solve one or more of the problems discussed above. The present systems and methods introduce the fluids at relatively high speed into a generally cylindrical separation chamber. The fluids flow in a generally circular path within the chamber, causing the solids to be urged outward from the axis of the chamber as the fluids flow from the upper portion of the chamber. Because the solids become concentrated at the outer wall of the chamber, the fluid in a central portion of the chamber is substantially free of the solids, and can be removed from the chamber via a fluid outlet. The solids concentrated at the outer wall of the chamber continue to move downward into an accumulation chamber in which the fluid speed is reduced, allowing the solids to settle out of the fluid.

One embodiment comprises an apparatus for separating sand or other solids from oil or other fluids that are produced from a well. The apparatus includes a generally cylindrical separation chamber having a vertically oriented axis. An inlet to the separation chamber is oriented tangentially with respect to the separation chamber, so that fluid entering the separation chamber through the inlet is caused to flow in a generally circular path within the separation chamber. A fluid outlet from the separation chamber is positioned to remove fluid from a central portion of the separation chamber. The separation chamber may be coupled to an accumulation chamber, wherein the accumulation chamber is connected to a lower end of the separation chamber, so that solids which settle out of the fluid fall into the accumulation chamber. The separation chamber may be removable from and replaceable on the accumulation chamber.

The apparatus may include an abrasion-resistant liner positioned within the separation chamber to reduce erosion of the separation chamber wall. The separation chamber may be tapered so that the upper inner diameter of the separation chamber is larger than the lower inner diameter of the separation chamber. In one embodiment, the taper is between 5 and 10 degrees, but alternative embodiments may have greater taper angles. The apparatus may include a vortex plate positioned near the lower end of the separation chamber to prevent vortices in the separation chamber from extending into the accumulation chamber.

Another embodiment comprises a method for separating sand or other solids from oil or other fluids that are produced from a well. The method includes the steps of introducing a solid-bearing fluid into a generally cylindrical separation chamber, so that the fluid is introduced into the separation chamber at a rate and direction that induces a generally circular flow, thereby causing solids in the fluid to be urged outward from a central portion of the separation chamber, and then removing the fluid from the central portion of the separation chamber.

Yet another embodiment comprises a system for separating sand or other solids from oil or other fluids that are produced from a well, where the system has a head assembly that is removable from and replaceable on a shell assembly, so that the system can be reconfigured by replacement of the head assembly. The head assembly includes a generally cylindrical separation chamber having a vertically oriented axis, an inlet to the separation chamber which is oriented tangentially with respect to the separation chamber to cause fluid entering the separation chamber to flow in a generally circular path within the chamber, and an outlet positioned to remove fluid from a central portion of the separation chamber. The shell assembly includes an accumulation chamber which is positioned below the separation chamber and configured to accumulate solids that settle out of the fluid.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
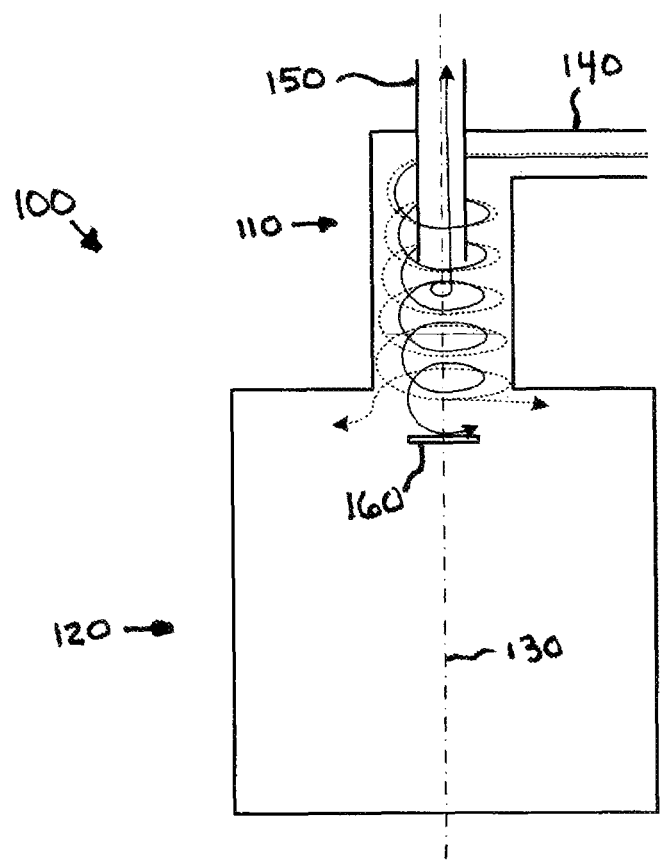
FIG. 1 is a diagram illustrating sectional side view of a sand-separating apparatus in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for removing sand and other solids that are suspended in fluids produced from wells. The present systems and methods introduce the fluids into a small separation chamber at a high speed and at an orientation that causes the fluid to circulate in a generally circular (e.g., helical) pattern within the chamber. This causes the solids suspended in the fluid to be urged away from the center of the chamber and toward the outer wall of the chamber. Fluid that is substantially free of suspended solids is then removed from the center of the chamber, while the solids settle and fall into an accumulation chamber that is positioned below the separation chamber.

One embodiment comprises a system for separating sand and other solids from oil and/or other fluids that may be produced from a well. The system includes a head assembly, which has a small separation chamber, and a shell assembly. The head assembly serves to separate the suspended solids from the fluids, while the shell assembly serves to collect the solids that are separated from the fluid. The head assembly may be designed to be removable and replaceable, so that a single system can be adapted to specific conditions (e.g., particular fluid temperatures, viscosities, etc.) simply by removing a head assembly that is not suitable for the existing conditions and replacing it with a head assembly that is suitable for these conditions.

The head assembly consists of a small separation chamber which is generally cylindrical in shape, a fluid inlet at the top of the chamber, and a fluid outlet which is open to a lower central portion of the chamber. Solid-bearing fluid is introduced into the separation chamber at a position and orientation which is generally tangential to the wall of the chamber. This causes the fluid to flow in a circular or helical path around the wall of the separation chamber. The cross-sectional opening of the fluid inlet that may be reduced from the cross-sectional area of a feed pipe which provides fluid to the system in order to increase the linear speed of the fluid as it enters the separation chamber. In one embodiment, the linear speed of the fluid is approximately 20 miles per hour (approximately 9 meters per second), and the upper diameter of the separation chamber is approximately 3-4 inches. The centrifugal force of the circularly flowing fluid causes the solids, which are heavier than the fluid, to move outward from the center of the chamber and toward the chamber wall. As the fluid moves downward, the solids become increasingly distributed toward the cylindrical wall of the chamber. When the fluid reaches the outlet, the fluid in the central portion of the separation chamber is substantially solid-free, while the fluid in the outer portion of the chamber (along the cylindrical wall) has the solids concentrated therein.

The shell assembly consists primarily of an accumulation chamber. The head assembly is coupled to the top of the shell assembly. After the fluid reaches the bottom of the separation chamber, it enters the accumulation chamber, which has a larger diameter and larger capacity than the separation chamber. The fluid in the larger accumulation chamber circulates at a much lower speed than the smaller separation chamber. The solids therefore tend to settle out of the slower moving fluid. Baffles may also be provided to facilitate settling of the solids. A small vortex plate may be positioned in the accumulation chamber near the opening of the separation chamber. This plate is designed to block the vortex caused by the circular/helical flow of fluid in the separation chamber from extending downward into the accumulation chamber. The vortex could otherwise cause the solids to be pulled upward toward the fluid outlet instead of settling downward into the accumulation chamber.

Figure 2:
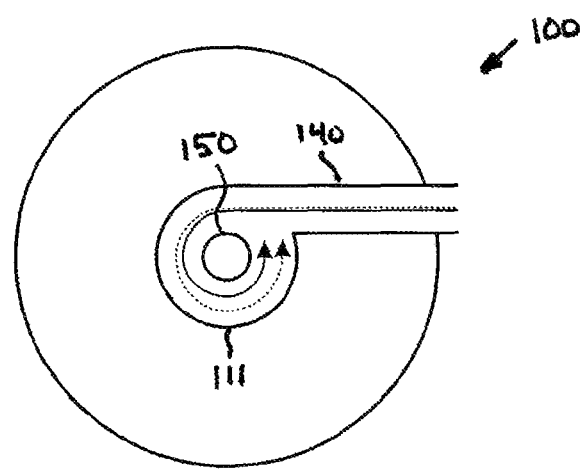
FIG. 2 is a diagram illustrating sectional top view of a sand-separating apparatus in accordance with one embodiment.

Referring to FIGS. 1 and 2, a pair of simple diagrams illustrating the structure and function of a sand-separating apparatus in accordance with one embodiment are shown. FIG. 1 is a sectional side view of the apparatus, while FIG. 2 is a sectional top view of the apparatus. In FIGS. 1 and 2, the path of fluid flowing through the apparatus is represented by the solid arrows, while the path of solids is represented by the dotted arrows.

Referring to FIG. 1, a sectional or cutaway of sand-separating apparatus 100 is presented. The apparatus includes two chambers: an upper, separation chamber 110; and a lower, accumulation chamber 120. Separation chamber 110 is generally cylindrical in shape. As will be described in more detail below, the separation chamber in some embodiments has a tapered wall (i.e., it is a conic section), so for the purposes of this disclosure, "cylindrical" should be construed to include such shapes. The axis (axis of symmetry) of separation chamber 110 is indicated as 130. A fluid inlet 140 is connected to the upper end of separation chamber 110 to enable the introduction of fluid into the chamber. A fluid outlet 150 extends from the upper end of separation chamber 110, into the chamber, and terminates at a central portion of the chamber. A vortex plate 160 is positioned in accumulation chamber 120 near the opening to separation chamber 110.

Referring to FIG. 2, a sectional top view of sand-separating apparatus 100 is shown. It can be seen in FIG. 2 that fluid inlet 140 is tangentially connected to separation chamber 110. In other words, rather than being oriented with its axis intersecting the axis (130) of the separation chamber, fluid inlet 140 is offset so that fluid flowing into separation chamber 110 through the inlet flows around the wall 111 of the chamber. The fluid continues to flow in this circular fashion as additional fluid flows into the chamber.

As shown in FIG. 1, the flow of the fluid is actually helical, since the incoming fluid at the top of the separation chamber forces the fluid which is already in the chamber to move downward. (For the purposes of this disclosure, "circular" should be construed to include this helical flow of fluid.) It can be seen in FIG. 1 that some of the fluid is drawn from the central portion of the chamber into fluid outlet 150, while some of the fluid continues to flow downward toward the accumulation chamber (as represented by the solid arrows). The sand, on the other hand, moves outward toward the wall of the separation chamber and away from the fluid outlet as it moves downward through the separation chamber (as represented by the dotted arrows). It should be noted that the arrows provide a conceptual representation of the flow of the fluid and solids, rather than the exact flow paths in an actual embodiment.

Figure 3:
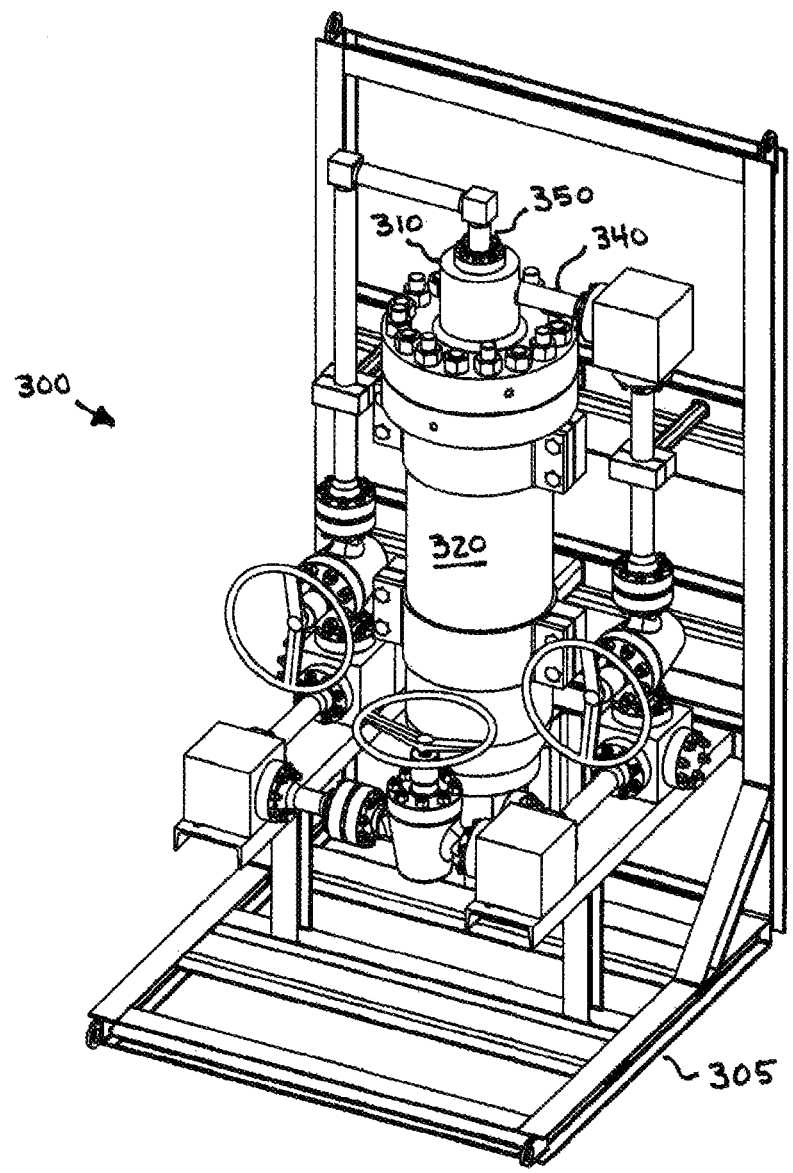
FIG. 3 is a perspective view of a skid-mounted sand-separator in accordance with this embodiment.
Figure 4:
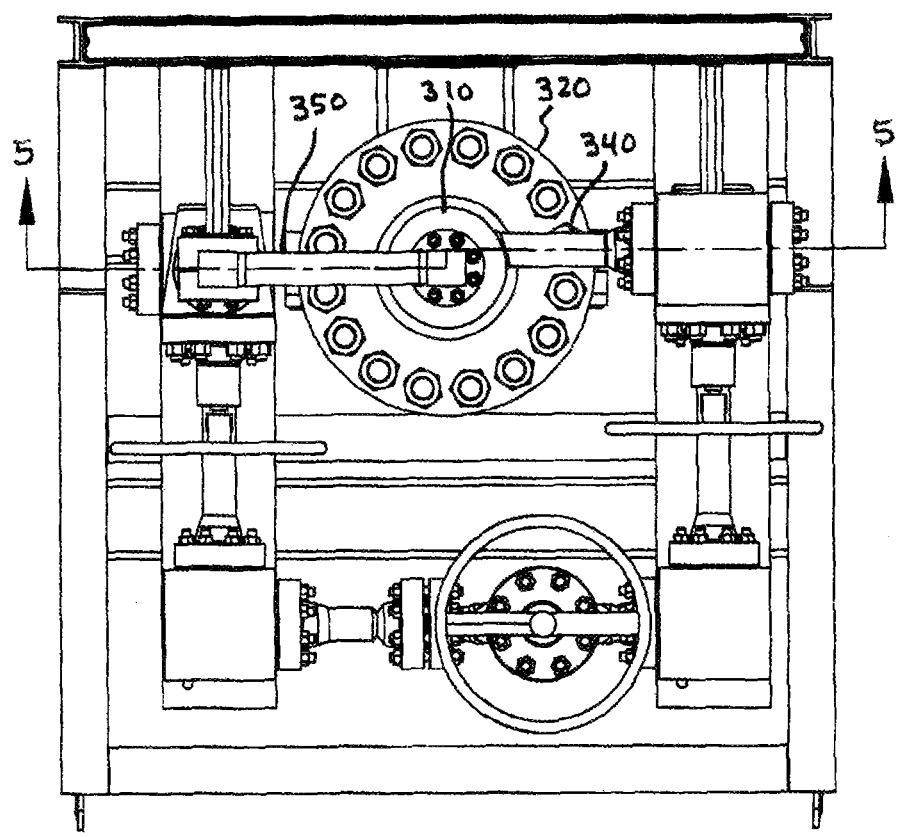
FIG. 4 is a top view of the skid-mounted sand-separator of FIG. 3.
Figure 5:
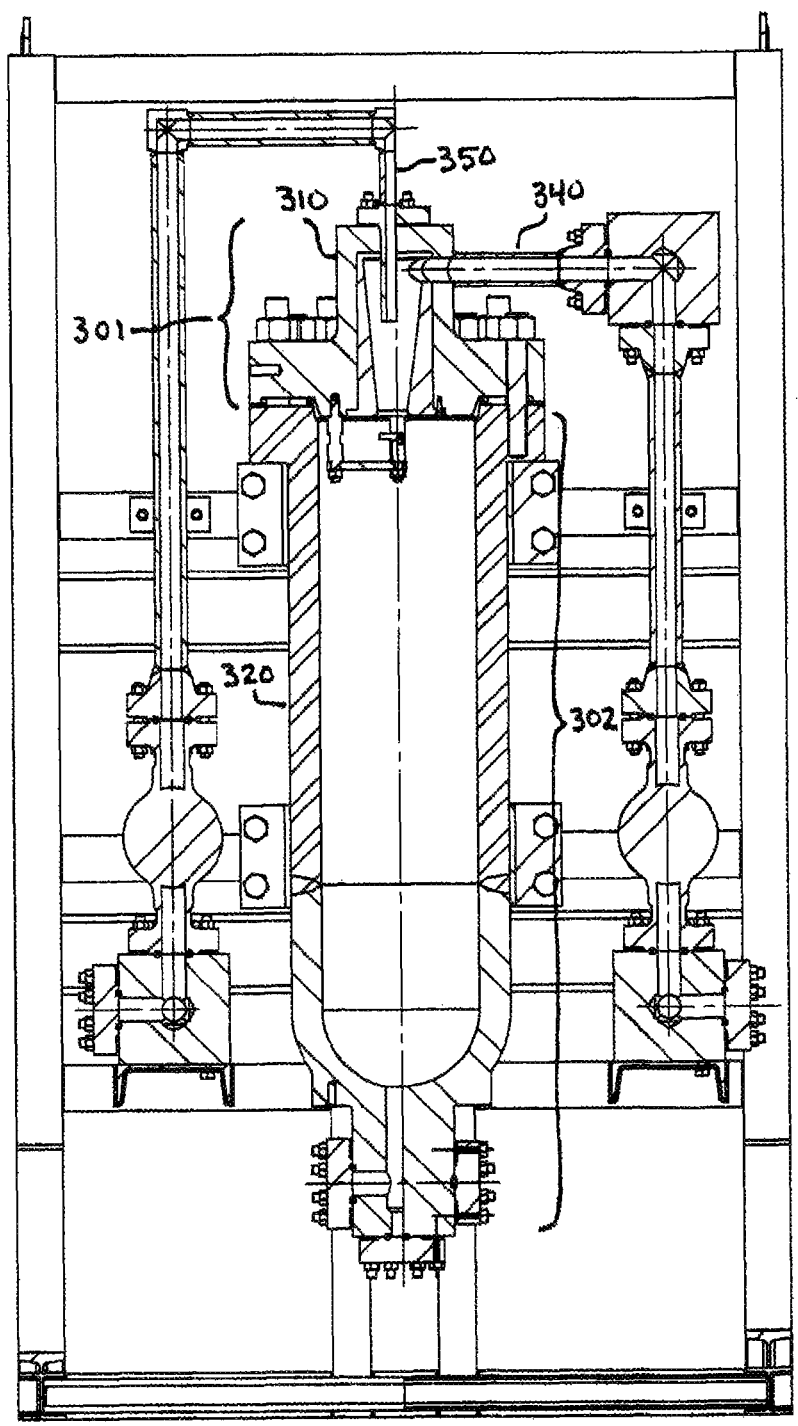
FIG. 5 is a front sectional view of the skid-mounted sand-separator of FIG. 3.
Figure 6:
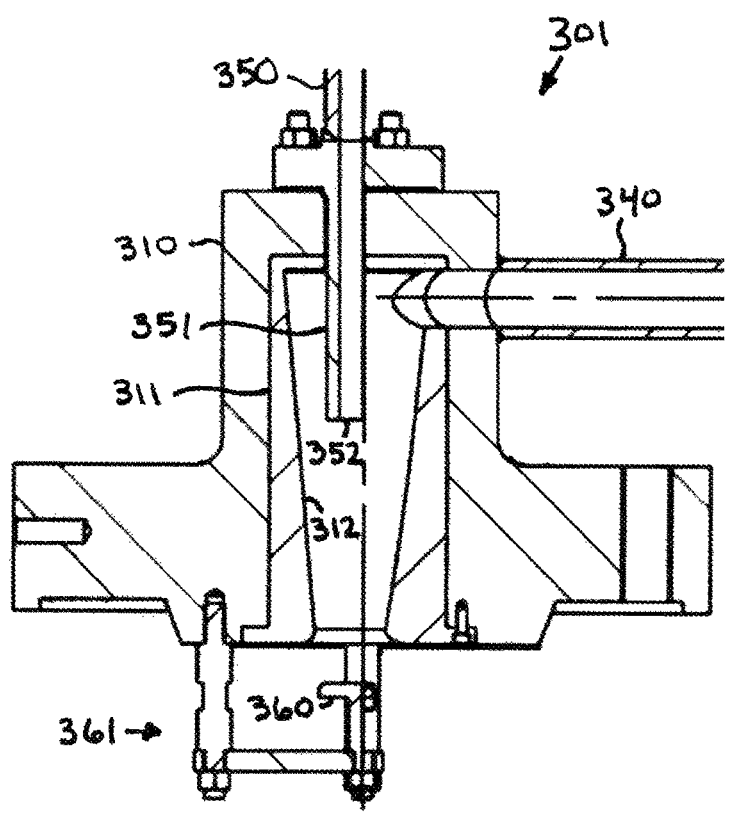
FIG. 6 is a detailed view of the head assembly of the skid-mounted sand-separator of FIG. 3.

Referring to FIGS. 3-6, several views of an exemplary embodiment of the invention are shown. FIG. 3 is a perspective view of a skid-mounted sand-separator in accordance with this embodiment. FIG. 4 is a top view of the skid-mounted sand-separator of FIG. 3. FIG. 5 is a sectional view of the skid-mounted sand-separator of FIG. 3. The view of FIG. 5 is sectioned as indicated in FIG. 4. FIG. 6 is a detailed view of the head assembly of the skid-mounted sand-separator of FIG. 3.

Referring to FIGS. 3-6, sand-separator 300 includes a head assembly 301 and a shell assembly 302 mounted on a skid assembly 305. Suitable piping is also provided on skid assembly 305 to couple the fluid inlet and outlet to other production equipment. Sand-bearing fluid enters head assembly 302 via fluid inlet 340. The fluid circulates in a generally circular path within separation chamber 310, causing the sand suspended in the fluid to be urged by the passively generated centrifugal force toward the wall of the chamber. ("Passively generated" refers to the fact that no moving parts are necessary to cause the circular flow of the fluid and to thereby induce the centrifugal force that moves the sand outward from the axis of the chamber.) As the fluid moves downward in separation chamber 310, the concentration of sand increases at the wall of the chamber and decreases near the axis of the chamber.

Head assembly 301 is mounted on top of shell assembly 302, so that the bottom of separation chamber 310 is open to accumulation chamber 320. As shown in FIG. 5, the inner diameter of accumulation chamber 320 is several times larger than the inner diameter of separation chamber 310. Accumulation chamber 320 is deeper as well. Consequently, when the circularly flowing sand-bearing fluid reaches the opening at the bottom of separation chamber 310, the speed at which the fluid is flowing is substantially reduced. The sand therefore tends to settle downward toward the bottom of accumulation chamber 320. The sand that has settled at the bottom of the accumulation chamber 320 can be periodically removed in the same manner as in conventional sand separation systems.

Referring to FIG. 6, head assembly 301 is shown in more detail. As explained above, fluid inlet 340 is connected to the upper portion of separation chamber 310, and is tangentially oriented to cause fluid entering the chamber to flow along the wall of the chamber in a circular/helical fashion. A lower portion 351 of fluid outlet 350 extends downward into separation chamber 310 from the top of the chamber. Fluid outlet 350 is oriented coaxially with separation chamber 310 so that the cavity within which the entering fluid flows is annular. This facilitates the circular flow of the fluid within the chamber. The lower portion 351 of fluid outlet 350 terminates at an opening 352 in a central portion of separation chamber 310. "Central portion" is used here to refer to a volume within separation chamber 310 near the center point of the chamber. In this embodiment, the central portion is around the chamber, just below the midpoint of the axis in the chamber. The shape and position of the central portion may vary from one embodiment to another, but is intended to indicate a volume which encompasses substantially sand-free fluid (the sand having been pulled away from this volume by centrifugal force).

The embodiment of FIGS. 3-6 includes a vortex plate 360. Vortex plate 360 is positioned just below the lower end of separation chamber 310. Vortex plate 360 is held in position by a vortex plate support structure 361. The helical flow of fluid through separation chamber 310 may create a vortex in the center of the chamber. The vortex is positioned generally on the axis of separation chamber 310, and may extend through the opening at the bottom of the separation chamber, into accumulation chamber 320. This vortex may cause sand to be pulled back up out of accumulation chamber 320 toward the central portion of separation chamber 310, where it could mix with previously sand-free fluid before the fluid flows out of the chamber through outlet 352. The vortex plate 360 is positioned below the opening of separation chamber 310 in order to impede the vortex formed within the separation chamber from extending downward into accumulation chamber 320. There is sufficient space between vortex plate 360 and the opening of separation chamber 310 to allow sand and fluid to flow outward (away from the axis) into the body of accumulation chamber 320.

The embodiment of FIGS. 3-6 includes a liner 311 that is installed within separation chamber 310. Liner 311 is formed from an abrasion-resistant material and is used to reduce erosion of the chamber wall 312 which occurs as a result of the sand which flows through the chamber. In this embodiment, liner 311 is removable and can be replaced when it becomes worn. In this embodiment, the inner wall 312 of separation chamber 310 (in this case the inner wall of liner 311) is slightly tapered. The cavity within separation chamber 310 is therefore a conic section rather than a true cylinder. Because the chamber wall is tapered, the inner diameter of the chamber gradually decreases from a larger diameter at the top to a smaller diameter at the bottom, where the separation chamber opens into the accumulation chamber. In the absence of the taper, it has been determined that the fluid speed decreases somewhat as the fluid moves downward through the chamber, thereby reducing the centrifugal force which urges the sand outward, away from the axis of the chamber. The gradually decreasing inner diameter of the tapered separation chamber serves to maintain the angular speed of the fluid as it flows in its circular/helical path through the chamber.

It should be noted that, because liner 311 is removable and replaceable, it can be changed not only when the liner is worn, but also when it is desired to change the configuration of the chamber wall 312. For instance, if it is desired to use a different taper angle, liner 311 can be removed and replaced with a second liner that has a different taper (or no taper at all). In one embodiment, the chamber wall is tapered at an angle of approximately 7 degrees, but other embodiments may use angles of, for example, 5-10 degrees. Larger or smaller angles are also possible. It should also be noted that liner 311 is optional, and may not be used in some embodiments. The inner wall of separation chamber 310 may be cylindrical or tapered, or may have some other shape, depending upon the requirements of each particular embodiment.

In one embodiment, head assembly 301 is removable and replaceable. As shown in FIGS. 3-6, head assembly 301 is bolted to shell assembly 302. This design facilitates the reconfiguration of the system to accommodate various fluid characteristics without requiring the use of an entirely different system. For example, a first head assembly may be designed to process fluid having a first combination of characteristics (e.g., corresponding viscosity, temperature, sand particle size, etc.). If it is desired to process fluid that has a second, substantially different set of characteristics, the first head assembly can be removed and replaced with a second head assembly that is designed to process fluid having the second set of characteristics. The two head assemblies may, for example, have different inner diameters, taper angles, lengths, outlet tube lengths, inlet sizes and orientations, vortex plate sizes and positions, etc. It should be noted that, in the embodiment of FIGS. 3-6, vortex plate 360 and the corresponding support structure are connected to the bottom of head assembly 301 and form a part of this assembly, so that they are replaceable as a unit.

It should be noted that several of the terms used in this disclosure are preceded by the descriptors "generally" or "substantially". These descriptors are used to indicate that a term which is preceded by one of these descriptors is intended to be construed broadly. For instance, a cylinder is a well-defined mathematical construct and it does not technically encompass conic sections. Because the separation chamber described above may be cylindrical, or may have a slightly tapered wall, the chamber is described as "generally cylindrical". Similarly, the fluid flow through the separation chamber is described as "generally circular", which should be construed to include helical and conical (helical with a decreasing diameter) flow paths. This interpretation of the terms used herein will be easily understood by a person of ordinary skill in the art of the invention.

While the foregoing disclosure primarily discusses systems and methods for removing sand from oil, they can be more broadly applied to the removal of other solids from various types of fluids. Consequently, as used above, "sand" should be construed to both sand and other types of solids that might be found in fluids produced from a well. Similarly, "fluids" should be construed to include oil, water, gas, and other fluids that might be produced from a well.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. An apparatus for separating sand or other solids from oil or other fluids that are produced from a well, the apparatus comprising:
    a generally cylindrical separation chamber having a vertically oriented axis;
    an inlet to the separation chamber, wherein the inlet is oriented tangentially with respect to the separation chamber, wherein fluid entering the separation chamber through the inlet is caused to flow in a generally circular path within the separation chamber, and wherein the inlet receives fluid from a feed pipe having a first cross-sectional area and the inlet has a second cross-sectional area which is less than the first cross-sectional area, thereby accelerating the fluid entering the separation chamber; and
    an outlet from the separation chamber, wherein an opening of the outlet within the separation chamber is positioned in a central portion of the separation chamber.

2. The apparatus of claim 1, wherein the separation chamber includes an abrasion-resistant liner positioned within the separation chamber, wherein at least a portion of the liner covers an upper portion of a wall of the separation chamber adjacent to the inlet and thereby reduces erosion of the upper portion of the wall of the separation chamber.

3. The apparatus of claim 1, wherein the separation chamber is tapered and wherein an upper diameter of the separation chamber is larger than a lower diameter of the separation chamber.

4. The apparatus of claim 3, wherein an angle between a wall of the separation chamber and the axis of the separation chamber is between 0 and 10 degrees.

5. The apparatus of claim 1, further comprising a vortex plate positioned near a lower end of the separation chamber on the axis of the separation chamber.

6. The apparatus of claim 1, further comprising an accumulation chamber, wherein the accumulation chamber is connected to a lower end of the separation chamber, wherein solids which settle out of a fluid flowing through the separation chamber fall into the accumulation chamber.

7. The apparatus of claim 6, wherein the separation chamber comprises an assembly which is removable from and replaceable on the accumulation chamber.

8. The apparatus of claim 1, wherein the inlet is positioned at an upper end of the separation chamber.

9. The apparatus of claim 1, wherein the outlet comprises a tubular structure which extends along the axis of the separation chamber from an upper end of the separation chamber, wherein the tubular structure has a lower opening in the separation chamber positioned at or below a vertical midpoint of the separation chamber.

10. A method for separating sand or other solids from oil or other fluids that are produced from a well, the method comprising:
    introducing a fluid containing solids into a generally cylindrical separation chamber, wherein the fluid is introduced into the separation chamber at a rate and direction that induces a generally circular flow of the fluid within the separation chamber, thereby causing solids in the fluid to be urged outward from a central portion of the separation chamber, and accelerating the fluid as the fluid enters the separation chamber; and
    removing the fluid from a point at or below a vertical midpoint the central portion of the separation chamber.

11. The method of claim 10, wherein introducing the fluid into the separation chamber comprises passing the fluid through an inlet to the separation chamber, wherein the fluid exits the inlet in a direction that is generally tangential to a wall of the separation chamber.

12. The method of claim 11, wherein accelerating the fluid comprises passing the fluid from a feed pipe to the inlet, wherein the feed pipe has a greater cross-sectional area than the inlet.

13. The method of claim 11, wherein the fluid is introduced into the separation chamber at a top portion of the separation chamber, and the fluid is caused to flow in a generally helical path to a bottom portion of the separation chamber.

14. The method of claim 13, further comprising covering a top portion of a separation chamber wall at which fluid introduced into the separation chamber is directed with an erosion-resistant liner.

15. The method of claim 11, wherein the separation chamber has a variable diameter and wherein the fluid is caused to flow within a smaller diameter as the fluid moves lower in the separation chamber.

16. The method of claim 11, wherein the separation chamber is tapered and wherein the fluid is caused to flow within a smaller diameter as the fluid moves lower in the separation chamber.

17. The method of claim 10, further comprising collecting solids that settle out of the fluid in an accumulation chamber.

18. The method of claim 17, further comprising blocking a vortex that is formed in the separation chamber from extending downward into the accumulation chamber.

19. A system for separating sand or other solids from oil or other fluids that are produced from a well, the system comprising:
    a head assembly having
        a generally cylindrical separation chamber having a vertically oriented axis,
        an inlet to the separation chamber, wherein the inlet is oriented tangentially with respect to the separation chamber, wherein fluid entering the separation chamber through the inlet is caused to flow in a generally circular path within the separation chamber, and wherein the inlet receives fluid from a feed pipe having a first cross-sectional area and the inlet has a second cross-sectional area which is less than the first cross-sectional area, thereby accelerating the fluid entering the separation chamber, and
        an outlet from the separation chamber, wherein an opening of the outlet within the separation chamber is positioned in a central portion of the separation chamber; and
    a shell assembly having an accumulation chamber configured to accumulate solids that settle out of the fluid.

20. The system of claim 19, wherein:
the inlet is positioned at an upper end of the separation chamber;
the outlet comprises a tubular structure which extends along the axis of the separation chamber from an upper end of the separation chamber, wherein the tubular structure is open to the separation chamber at or below a vertical midpoint of the chamber;
the separation chamber includes an abrasion-resistant liner positioned within the separation chamber, wherein at least a portion of the liner covers an upper portion of a wall of the separation chamber adjacent to the inlet and thereby reduces erosion of the upper portion of the wall of the separation chamber;
the wall of the separation chamber is tapered and wherein an upper diameter of the separation chamber is larger than a lower diameter of the separation chamber; and
the head assembly further comprises a vortex plate positioned near a lower end of the separation chamber on the axis of the separation chamber.

* * * * *